United States Patent
Udovichenko et al.

(10) Patent No.: US 6,415,239 B1
(45) Date of Patent: Jul. 2, 2002

(54) METHOD AND DEVICE FOR MEASURING PHYSICAL VALUES USING A COMPUTER

(76) Inventors: Nikolai A. Udovichenko, ul. Reshetnikova, d. 19. kv. 201, St. Petersburg 195106; Andrei B. Stefanov, ul. Kuibysheva, d. 22, kv. 30, St. Petersburg 197046; Yuri N. Fyodorov, ul. Zheni Egorovoi, d. 3, kv. 265, St. Petersburg 194255, all of (RU)

( * ) Notice: Subject to any disclaimer, the term of this patent is extended or adjusted under 35 U.S.C. 154(b) by 0 days.

(21) Appl. No.: 09/230,240

(22) PCT Filed: Jul. 25, 1997

(86) PCT No.: PCT/RU97/00233

§ 371 (c)(1),
(2), (4) Date: Jan. 20, 1999

(87) PCT Pub. No.: WO98/03837

PCT Pub. Date: Jan. 29, 1998

(30) Foreign Application Priority Data

Jul. 24, 1996 (RU) .............................. 96115445
Aug. 6, 1996 (RU) .............................. 96116489

(51) Int. Cl.[7] .............................. G06F 15/00; H03K 3/00
(52) U.S. Cl. .................. 702/127; 702/65; 702/130; 327/100

(58) Field of Search .................. 702/104, 127–130, 702/133–138, 75–76, 64–65; 327/100–101, 102

(56) References Cited

U.S. PATENT DOCUMENTS

| | | | | |
|---|---|---|---|---|
| 4,504,922 A | * | 3/1985 | Johnson et al. | 702/133 |
| 4,568,933 A | * | 2/1986 | McCracken et al. | 73/152.51 |
| 4,721,849 A | * | 1/1988 | David et al. | 235/472.01 |
| 5,121,051 A | * | 6/1992 | Steinbrecher et al. | 702/88 |
| 5,181,423 A | * | 1/1993 | Philipps et al. | 702/138 |

* cited by examiner

Primary Examiner—Bryan Bui
(74) Attorney, Agent, or Firm—I. Zborovsky

(57) ABSTRACT

The present invention relates to the field of computerize measuring techniques used to obtain and process metrological information for general purpose or specification applications. According to the present invention, the output channel of a formatter (2) having a sensitive element (1) connected thereto is linked to the input of the audio adapter (5) of a multimedia personal computer (6). This method may be used to increase the measurement precision, ability, reliability, as well as to normalize and simplify the measurement procedures, and to provide electrical insulation using the wireless remote link that connects the measuring system components.

6 Claims, 2 Drawing Sheets

METHOD AND DEVICE FOR MEASURING PHYSICAL VALUES USING A COMPUTER

TECHNICAL FIELD

The present invention relates to the field of measuring technique, using a computer to obtain and process metrological information of general and specific applications.

BACKGROUND ART

Methods of measuring using a computer are known, which are based on a conversion of a physical value into an electrical voltage, containing a metrological information in its level (Japanese application 5-25409, GO1D 9/00 04/09/93 and International application 94/12940, GO6F 15/20, 06/09/94). A method of conversion of a physical value into an electrical voltage of its level is known, in which the information about the value to be measured is contained in a length of pulse (period) of voltage. ("Connection of sensors and data input devices with a computer IBM PC, edited by U. Tompkins and J. Webster, M. "MIR" 1999, page 312). The methods are realized by corresponding devices.

On the other hand, in metrology and automation a great class of sensors is known (a sensor is a sensitive element which generates an electrical voltage directly or jointly with a current source) which initially form an output signal as an alternating voltage which contains the information in an amplitude and/or in a frequency (period).

At the same time many sensors of direct voltage are often characterized by an intermediate conversion of the direct voltage into alternating voltage due to the complications of drifts, noises of direct current amplifiers, interferences, instability of a power source, transmission of direct current signals, and because of this the necessity of decoupling of the object of measurement with the measuring devices. In principle contactless measurements are performed as to the alternating signal. Therefore the output signal of the sensor is preferably to be formed in the form of alternating voltage or current.

From the metrological point of view during this process for the accuracy, a range which covers four decimals orders of frequency measurement is sufficient.

A method is also known for measuring a physical value (application of France 2697080, GO1B 3/02 04/22194) in accordance with which an a periodical signal is formed with a length proportional to the value to be measured. For this purpose the standard capacitor is charged through a resistor, with an electrical resistance sensitive to the value to be measured.

The device which realizes this method includes a thermal resistor and several elements which are connected with it in series: a capacitor and a transistor, with the transistor connected parallel to the capacitor. These elements and the thermal resistor form an oscillating circuit, and parameters of the elements provide a length of the output signal. The above listed elements and a Schmidt trigger form a formatter of pulse electric voltage. The output of the formatter is connected with a digital input of the computer. The device operates in the following manner. In response to a computer signal, the transistor is closed and at the same moment an inner time counter is started in the computer. The capacitor through the thermal resistor is charged with electric current to the moment of switching of the Schmidt trigger. This moment of charging of the capacitor is fixed in that, the signal of voltage change from the output of the Schmidt trigger is supplied into the computer so as to stop its internal counter, and based on the signal the computer converts the transistor into the saturation mode. The capacitor discharge is performed through the inner resistance of the transistor. Information about the value to be measured is contained in the internal counter of the computer.

This method and device allow to measure a physical value (temperature). Substantial disadvantages of the known method and the device which realizes it are the following:

low accuracy of measurement due to generation of systematic mistakes of measurements because of non linearty and temperature dependence of parameters of formatter components;

limited functional possibility, which do not allow using of widely used personal computers without special additional devices and program-drivers.

DISCLOSURE OF THE INVENTION

A main object of the invention is to increase accuracy and stability of measurement with simultaneous expansion of functional possibilities, simplification and unification of a procedure, the treatment and program and supply of input/output, accumulation, processing, registration and visualization of measuring information, which allows the expansion of areas of measurements of physical parameters, including their availability for (mass) consumer.

Additional objections are:

increase of reliability measurements;

providing of electrical decoupling, up to remote cordless communication between components of a measuring system;

increase of resolution ability of measurements.

The main objective of measuring a physical value with the use of a computer is resolved in that, the sensitive element is subjected to a physical action, and electro-oscillating process is organized using an electrical parameter of the sensing element, under the action of the electro-oscillating process an electrical voltage is formed which is supplied to an input of computers, and in accordance with the present invention the electro-oscillating process is organized to be a periodical process, a voltage is formed with a level and frequency of information-meaningful components of its frequency spectrum which satisfy, within a range of measurement of a physical value, the parameters of input of an audio adapter of the computer, which corresponds to the specification of Multimedia Personal Computer (MPC), and during this process the input of the computer is the input of its audio adapter.

Thereby, in accordance with the proposed method, an action is applied to the sensitive element whose electrical parameter depends on the physical value characterizing the given physical action, the electrical signal is formed whose parameters changes in accordance with the change of the parameter of the sensitive element, and the electrical signal is supplied into the computer for its processing, and at the same time the computer is used which is provided with an audio adapter, and the said cylindrical signal is formed as a periodical signal whose amplitude and frequency correspond to the parameters of the input of the computer audio adapter, to which the formed signal is supplied.

The objective is also resolved by a device which includes a computer, a sensing element, a formatter of an alternating electrical voltage connected with it and connecting a frequency-providing element, wherein in accordance with the invention, the formatter additionally contains a converter of voltage level whose output is an output of the formatter, the output of the formatter is connected with the input of the computer audio adapter which corresponds to the specification Multimedia Personal Computer, frequency-providing elements of the formatter have parameters which provide a frequency of information-valuable components of a frequency spectrum of the output voltage within limits which satisfy the parameters of the input of the computer audio adapter in the whole range of the measurement of the physical value.

The device in accordance with the present invention provides input/output, accumulation and registration of the metrological information.

Therefore, the essence of the proposed method and device is embodied in the following:

1. Formation of a sensor signal in form of a periodical (alternating) voltage;
2. Supply of the signal to an input of the computer audio adapter;
3. Use of the computer which includes the audio adapter representing a unified assembly with respect to the system program set.

Therefore, with an insignificant modification, and many cases a simplification of a procedure and a diagram of forming of the output sensor signal and its supply to the input of the computer audio adapter, it is no longer necessary to develop programs-drivers of input/output of the information by a user.

Because of this, the accuracy of measurements is increased and a unification of the program for input/output of the information is provided, which is accepted by various sensors of one or several uniform or different physical values.

In accordance with a preferable embodiment of the device of the present invention, the converter of the voltage level is formed either as mutually coordinated opto-electronic transmitter and the receiver connected with the input of the audio adapter, or a transformer with a secondary winding connected with the input of the audio adapter.

The best results are obtained in this device in accordance with this invention, in which for measuring of two different physical values, the formatters are connected with two (left and right) channels of the input of the audio adapter.

The additional objectives are resolved also in that, in accordance with the invention, the device includes an identifier of the sensitive element and the formatter, connected with a digital input of the computer, and also in that it is provided with a block of controlling the formatter, with the input of the block connected to the digital output of the computer (for example, series or parallel interface) or digital output of the computer audio adapter, (for example MIDI-interface) and the output of the block is connected with the formatter.

BEST MODE OF CARRYING THE INVENTION

In accordance with a best mode of carrying the proposed method of measurement, a circuit is selected which operates into auto-oscillating mode (a multivibrator, a generator, etc.) with a sensing element which forms one of frequency-providing elements. The sensing element is subjected to a physical action so as to change its electrical parameter. Since the parameter of the sensing element participates in formation of the electrical audio-oscillating process, this will lead to a change of a parameter of the process (its frequency and/or amplitude), and correspondingly its frequency (or/and amplitude) of the output voltage of the formatter. In the selected circuit with the multi vibrator, the signal at its output contains a great number of harmonics, but the information-valuable harmonic is its base, first harmonic. Because of this, the parameters of the frequency-providing elements of the formatter are selected so that in the whole range of measurement of the physical value, the main harmonic of the frequency spectrum of the output voltage will be coordinated with the input parameter of the computer audio adapter, whose configuration corresponds to the specification Multimedia Personnel Computer. For some measurements, the information-valuable can be a second and subsequent harmonics, or only them. With the use of resistance sensors (thermal resistor, photo-resistor, tenzoresistor), it is very convenient to use a formatter which is formed in accordance with the circuit shown in FIG. 2. With the capacitive sensor (temperatures, sizes and other values) and sensors using capacitive effect (of force, displacement, pressure, etc.), a circuit of high-frequency capacitative generator is utilized, and the output voltage of the circuit with required parameters is obtained by mixing of voltages from the measuring and basic generator. For non-parameter sensors (photodiode thermo couple, etc.) a generator circuit is utilized which is controlled by voltage (GCV). The assumptions presented hereinabove about the information-valuable component are true regardless of the selection of a concrete circuit for realization of GCV. For contactless Hall sensors it is necessary to stabilize the value of output current in the circuit in which the sensor is introduced.

The computation of the physical value is performed in the computer. The signal introduced in the computer is subjected to a Fourier conversion so as to separate the information-valuable component of the frequency spectrum, and using the values stored in the memory of computer of transmission characteristics of the sensitive element, formatter, computer audio adapter, compute by the program a magnitude of the physical value.

Figure 1:
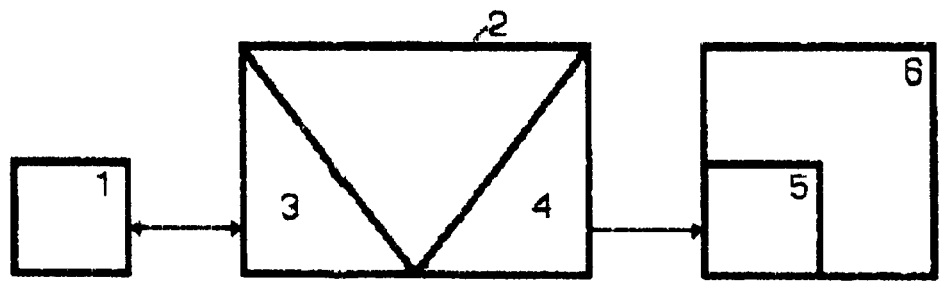
FIG. 1 shows a functional diagram of a device for performing a method.

The method is realized in the operation of the device, who functional diagram is shown in FIG. 1. The device has a sensitive element 1, a formatter 2 of alternating electrical voltage connected with it and containing frequency-providing elements 3 with parameters which provide for the information-valuable components of the frequency spectrum its output voltage frequency and its change within limits which satisfy the parameters of the input of the audio adapter 5 of the computer 6 which is connected to the output of the level converter 4, which corresponds to the specification Multimedia Personal Computer. The level converter 4 can be formed as optical transmitter and receiver of information connected with one another, and also as a coordinating transformer or radio transmitter.

The device operates in the following manner. The value to be measured acts on the sensitive element 1 and this leads to a change of its electrical parameter, and thereby a parameter of the electro-oscillating process in the formatter 2 of alternating electrical voltage changes as well, and also a frequency of its output voltage. The latter, from the output of the level converter 4, is supplied to the input of the audio adapter 5 of the computer 6 whose configuration corresponds to the specification Multimedia Personnel Computer. In the computer, using standard sets of programs of input and output and Fourier transformation as well as the information about a transmitting characteristic of the formatter and the parameters of its frequency-providing elements contained in the computer memory, the magnitude of the value to be measured is calculated.

Figure 2:
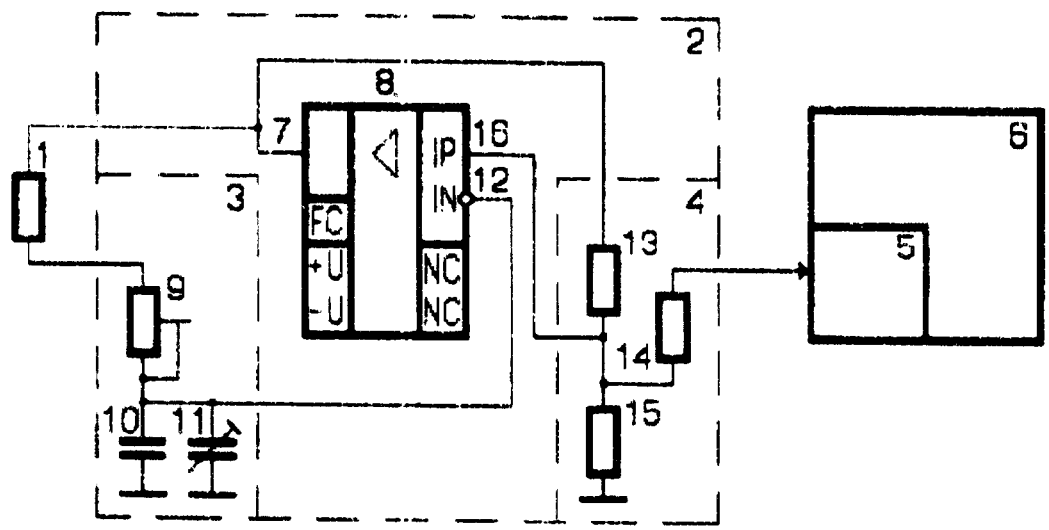
FIG. 2 shows an example of realization-a principle diagram of the device for measuring a temperature.

FIG. 2 shows a principle diagram-an example of realization of the device for a temperature measurement.

The device has a sensitive element (thermo resistor) 1 connected with an output 7 of an amplifier 8 of the formatter 2 of alternating electrical voltage and through a regulating resistor 9 with a measuring capacitor 10, an adjusting capacitor 11 and an inverting input 12 of the amplifier 8. The output 7 of the amplifier 8 is connected also with resistors 13, 14, and 15 of the voltage level converter 4, and through the resistor 13 with the non-inverting input 16 of the amplifier 8. Through the resistor 15 the non-inverting input 16 is connected with an "analog ground" and through the resistor 14 with the input of the audio adapter 5 of the computer 6 of the specification MPC, provided with a program set. The inverting input 12 of the amplifier 8 is connected through the capacitor 10 and the adjusting capacitor 11 with the "analog ground".

The device operates in the following manner. The initial condition of the diagram is determined by absence of charge at the capacitor 10, 11 and therefore practically zero voltage at the inverting input 12 of the amplifier 8. At the same time a part of the output voltage and the amplifier 8 is supplied from the resistors 13, 15 of the voltage level converter 4 of the formatter to the non-inverting input 16 of the amplifier 8 and exceeds the voltage at the inverting input 12. As a result, the voltage at the output 7 of the amplifier 8 has a positive polarity and a magnitude which is determined by the supply voltage and the inner diagram of the amplifier. The capacitors 10 and 11 start being charged with current which flows from the output 7 of the amplifier 8 through the sensing element 1 and the adjusting resistor 9 to the "analog ground". A charge starts to accumulate at the plates of the capacitor. During charging of the capacitor, voltage drop at it (in accordance with module) will increase until it exceeds the voltage at the non-inverting input 16. Then the sign of the output voltage of the amplifier 8 changes to an opposite sign, and the process repeats again. Therefore, the frequency of the main harmonic of the output voltage is determined by the time constant which numerically is equal to product of a sum of magnitudes of resistances of the sensitive element 1 and the adjusting resistor 9 by the sum capacity of the measuring 10 and adjusting 11 capacitors, which makes possible to unmistakenly connect the frequency of the main harmonic with the value to be measured. A change of the measuring temperature leads to a change of resistance of the sensitive element 1, or in other words the time of charging, and correspondingly frequency of the main harmonic of the output alternating electrical voltage which is supplied to the input of the audio adapter 5 of the computer 6 of the specification MPC. The computer which is provided with a program set calculates the value to be measured. By changing the magnitude of the adjusting resistor 9 and adjusting capacitor 11, for a concrete type of the sensing element 1 and the selected range of temperature measurements, a main frequency of generation within the range corresponding to the input parameters of the audio adapter 5 of the computer 6 is provided. The resistor 13, 14, 15 provide a correspondence to the input parameters of the audio adapter with respect to the level of the voltage of the formatter 2 supplied to its input.

The example for realization illustrates the simplicity of the used circuitry solutions. Because of this, it is easy to provide the possibility of manufacture, including series manufacture of modules of the sensor with the formatter. The availability of a row of such modules presents an objective of their identification with unmistakable connection and correspondingly reliability increase of measurements as a whole. The module of the sensitive element (sensor and formatter) provided with the identifier in turn makes possible a unification of the measurement procedure.

Figure 3:
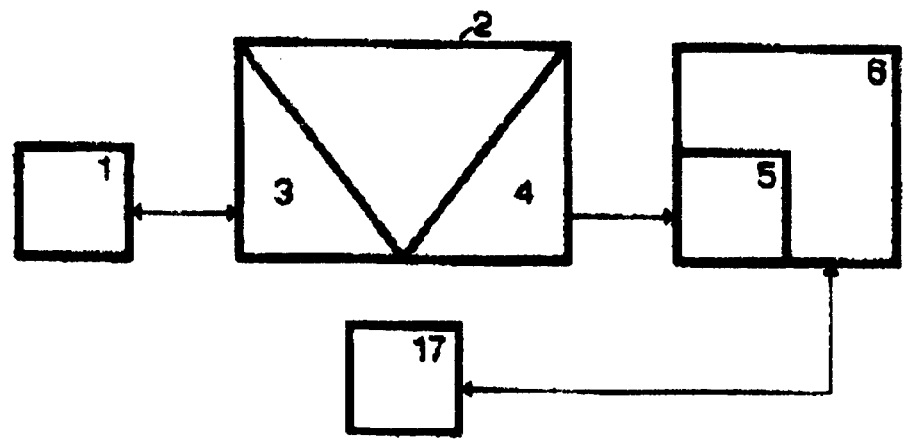
FIG. 3 shows a functional diagram of a device containing an identifier of a sensing element and a formatter.

FIG. 3 shows a functional diagram of the device which contains the identifier of the sensitive element and formatter.

The device, in addition to the components listed above, contains the identifier 17 which can be formed as energy-independent constant memory device, whose input is connected to a digital input of the computer 6. The identifier contains a recognizing information about the type of the sensor and formatter type and range of measurement of a physical value, grading of the sensitive element and formatter.

The device operates in the following manner. A value to be measured acts on for the sensing element 1, which leads to a change of its parameter. As a result, a parameter of the electro-oscillating process is changed in the formatter 2 of the alternating electrical voltage, and correspondingly its output voltage. The latter from the output of the level converter 4, is supplied to the input of the audio adapter 5 of the computer 6, whose configuration corresponds to the specification Multimedia Personal Computer, is processed and with the use of the program set and information about the type of the sensor, transmitting characteristics and formatter and parameters of frequency-providing elements read from the identifier 17, make possible the determination of the magnitude of the measuring value.

Figure 4:
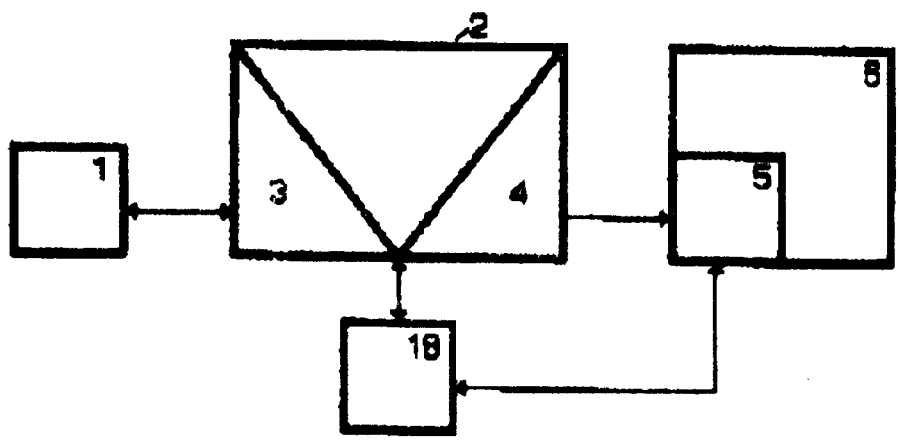
FIG. 4 shows a functional diagram of a device containing a block for controlling the formatter.

The objective of controlling the formatter for increase of resolution and expansion of measurement range is resolved by device which contains a block for controlling of formatter. FIG. 4 shows the functional diagram of this device.

The device, in addition to the above listed components, has a block 18 for controlling the formatter 2, which is connected to a digital input of the audio adapter 5 (for example MIDI interface) or digital output (series or parallel interface) of the computer 6. The control block can be formed with on a rigid logic or as a micro controller whose input is connected to and coordinated with a series interface of the computer. The controller, with use of the series or MIDI interfaces, converts the specific code into a parallel code. From the output of the micro controller, the parallel code of the logical signals is used for controlling analogous keys which recommutate sensitive and frequency-providing elements and elements of level coordination.

The device operates in the following manner. With initialization of the device, the computer 6, depending on the required measuring range, provides through the block for controlling of the formatter 18, transmitting characterstics of the formatter and parameters its frequency-providing elements. The measuring value acts on the sensing element 1 which leads to the change of its parameter. As a result, the parameter of the electro-oscillating process in the formatter 2 of alternating electrical voltage changes and correspondingly its output voltage. The latter, from the output of the level converter 4, is supplied to the input of the audio adapter 5 of the computer 6 whose configuration corresponds to the specification Multimedia Personnel Computer, is processed, and with the use of the program set and information about the given transmitting characteristics of formatter and parameters of its frequency-providing elements, makes possible the determination of the magnitude of the measuring value.

Therefore, the availability of such features as:

periodicity of the oscillating process during formation of voltage, due to which the influence of instability of characteristics of components of formatter on information-valuable parameters of its output voltage are mutually compensated and accuracy of measurements of physical value is increased;

more preferable, for the purpose of measurement of parameters forming voltage in correspondingly the conditions of its coordination with the input parameters of computers, which minimize the number of operations during formation of voltage and provide new functional possibilities;

supply of formed voltage to the input of the audio adapter of the computer with the specification MPC, which increases the functional possibilities due to the use as the information-valuable parameters of both the length and the level, and also a frequency of the forming voltage;

use of unified technical means which complete the procedure of measurements—a computer of a widely spread specification MPC which in turns substantially simplifies the procedure of input/output information for measurements and unifies it;

introduction into the formatter of the device of level converter which coordinates the output voltage with the corresponding input parameters of the computer, and also the forming of the level converters as one or another means for electrical decoupling;

expansion functional possibilities of the method by providing the measurements with the use of unified personal computers of the specification MPC provided with standard adapters for input/output of information, to simplify and unify the procedure of measurements with simultaneous increase of the accuracy and reliability.

The additional differences of the device which are directed to increase of both reliability of measurements and unification of their procedure, are the availability of the identifier of the sensing element and formatter and also the availability of the block for controlling the formatter, which makes possible selection of optimal ratios of accuracy, range and time of measurements of physical value, and also measurements of some physical values including simultaneous measurements, with the use of a single computer.

INDUSTRIAL APPLICABILITY

The invention can be used in a measuring technique, which utilizes a computer for obtaining and processing of metrological information for various applications.

What is claimed is:

1. Method of measuring of a physical value with the use of computer, in that a sensing element (1) is subjected to a physical action, an electro-oscillating process is organized with the use of an electrical parameter of the sensing element (1), an electrical voltage is formed under the action of the electro-oscillating process, which electrical voltage is supplied to an input of the computer, characterized in that the electro-oscillating process is organized periodically, the voltage is formed with a level and frequency of information-valuable components of a voltage frequency spectrum which components satisfy within a range of measurement of the physical value, parameters of the input of an audio adapter (5) of a computer (6) which corresponds to the specification Multimedia Personal Computer, and the input of the computer (6) is an input of the audio adapter (5) of the computer (6).

2. A device for measuring a physical value, including a computer (6), a sensitive element (1) connected with the computer, a formatter (2) of alternating electrical voltage containing frequency-providing elements (3), characterized in that the formatter (2) additionally contains a voltage level converter (4) whose output is an output of the formatter (2), the output formatter (2) is connected with the input of the audio adapter (5) of the computer (6) whose configuration corresponds to the specification Multimedia Personnel Computer, the frequency providing elements (3) of the formatter have further parameters which provide a frequency of information-valuable components of the frequency spectrum of an output voltage of the formatter within limits satisfying the parameters of the input of the audio adapter (5) of the computer (6) in a whole range of measurements of the physical value.

3. A device in accordance with claim 2, characterized in that the voltage level converter (4) is formed as opto-electronic coordinated transmitter and receiver connected with the input of the audio adapter (5).

4. A device in accordance with claim 2, characterized in that the voltage level converter (4) is formed as a transformer whose secondary winding is connected with the input of the audio adapter (5).

5. A device in accordance with claim 2, characterized in that additionally it contains an identifier (17) of the sensitive element and the formatter, connected with the digital input of the computer (6) or the audio adapter (5) of the computer.

6. A device in accordance with claim 2, characterized in that it is provided with a block (8) for controlling the formatter, connected with a digital output of the computer (6) or the audio adapter (5) of the computer.

* * * * *